April 4, 1967
C. C. CLAPP ETAL
3,312,327
PLYWOOD LAY-UP MACHINE
Original Filed Sept. 5, 1961
11 Sheets-Sheet 8
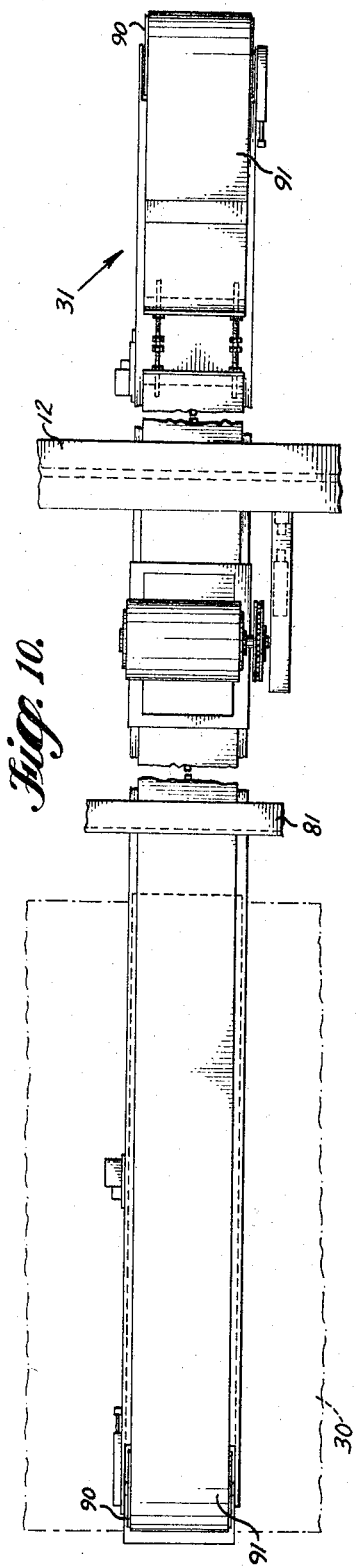
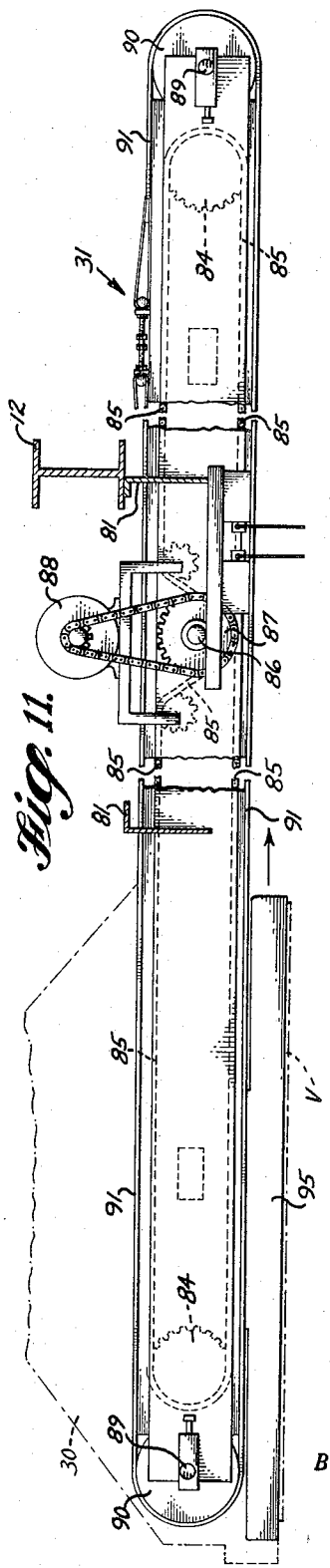
INVENTORS
CHARLES C. CLAPP
BYRON B. BROOKHYSER
BY FREMONT R. CODY
ATTORNEY

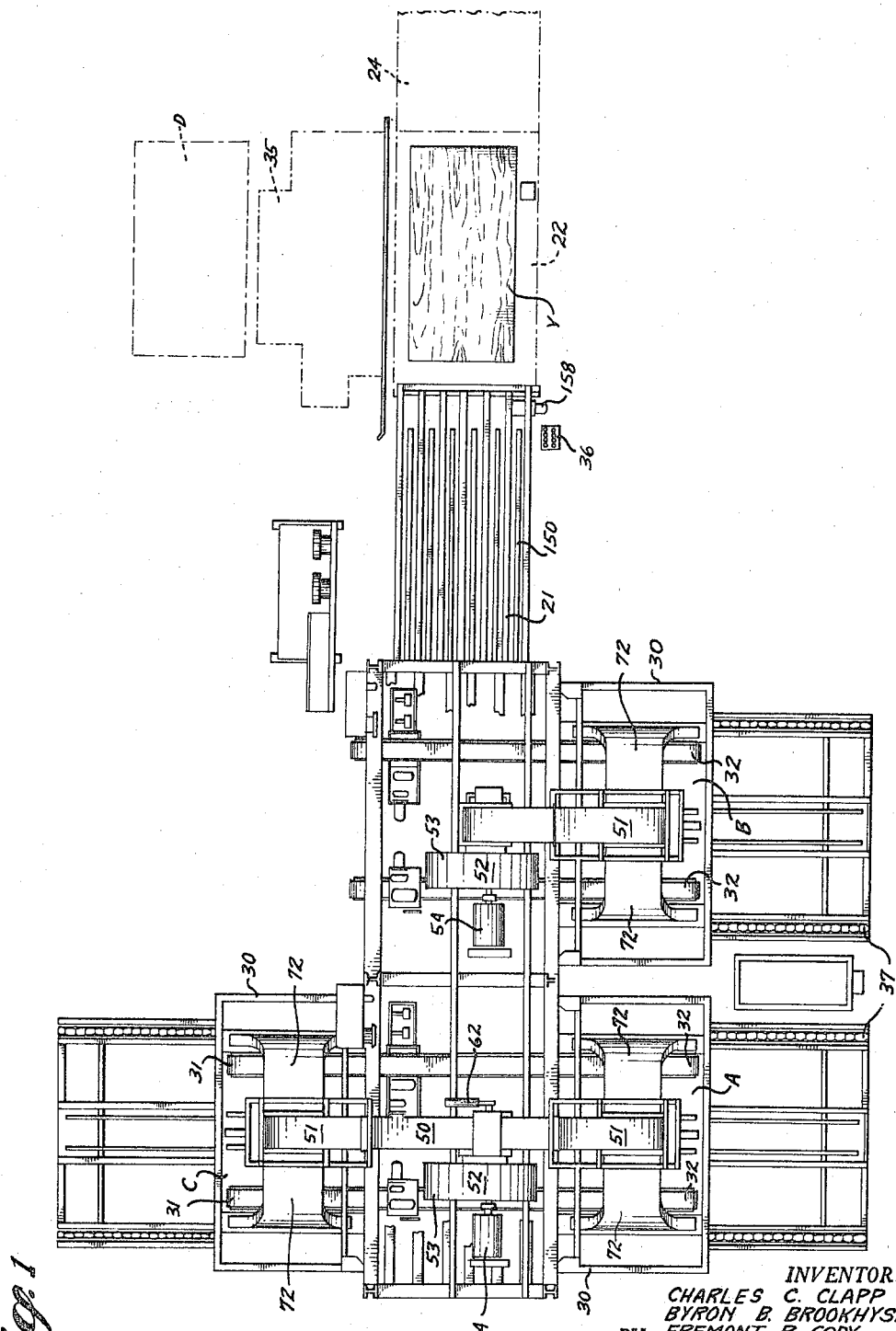

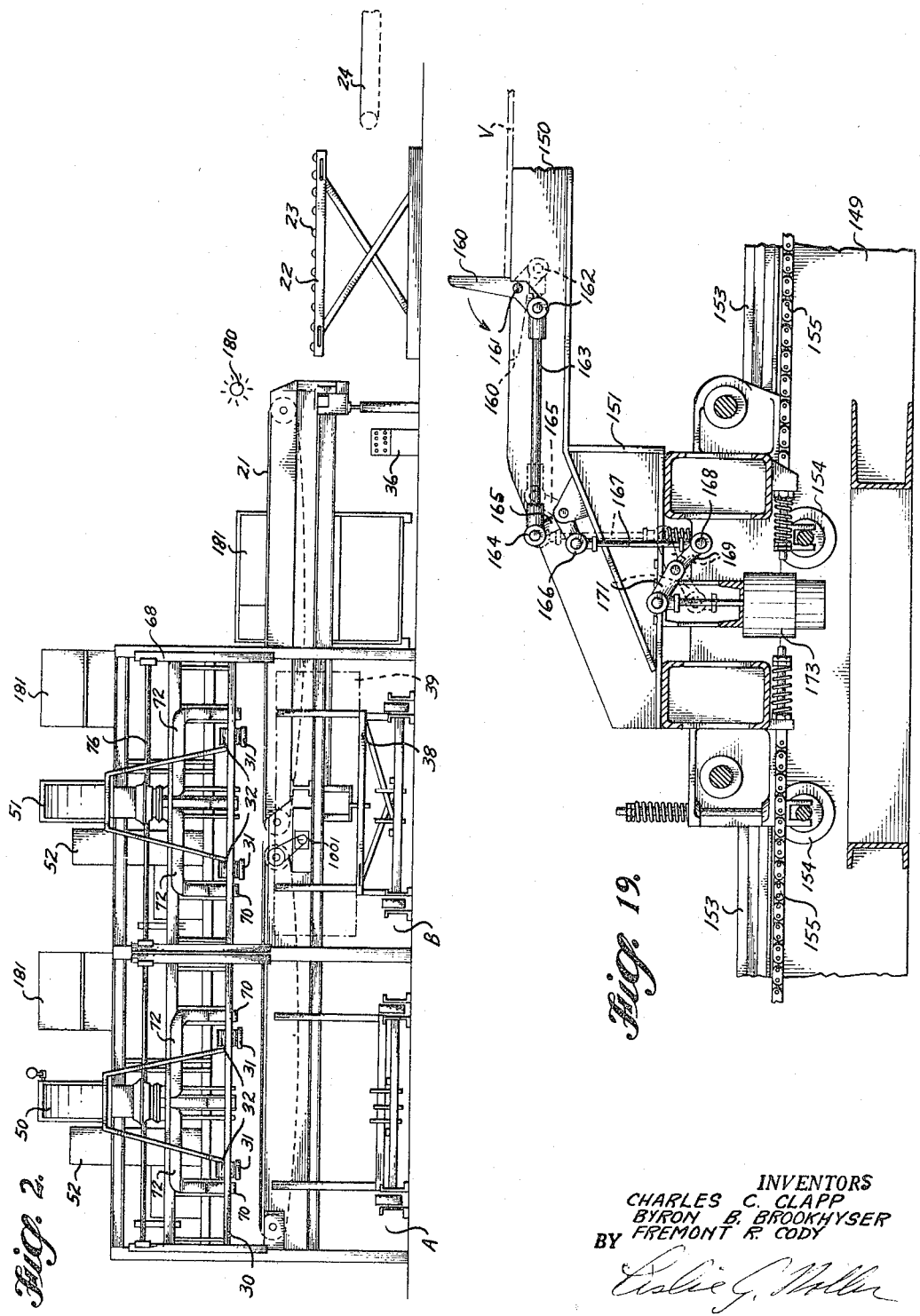

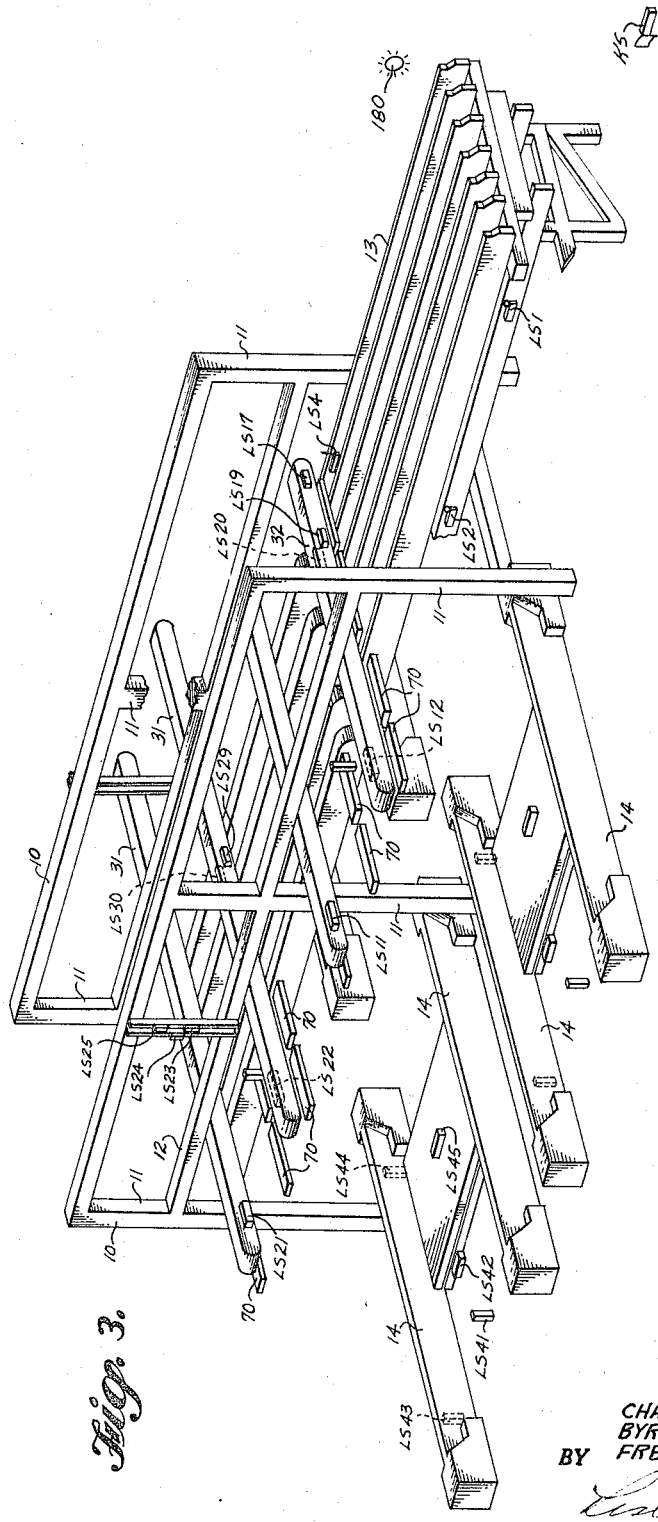

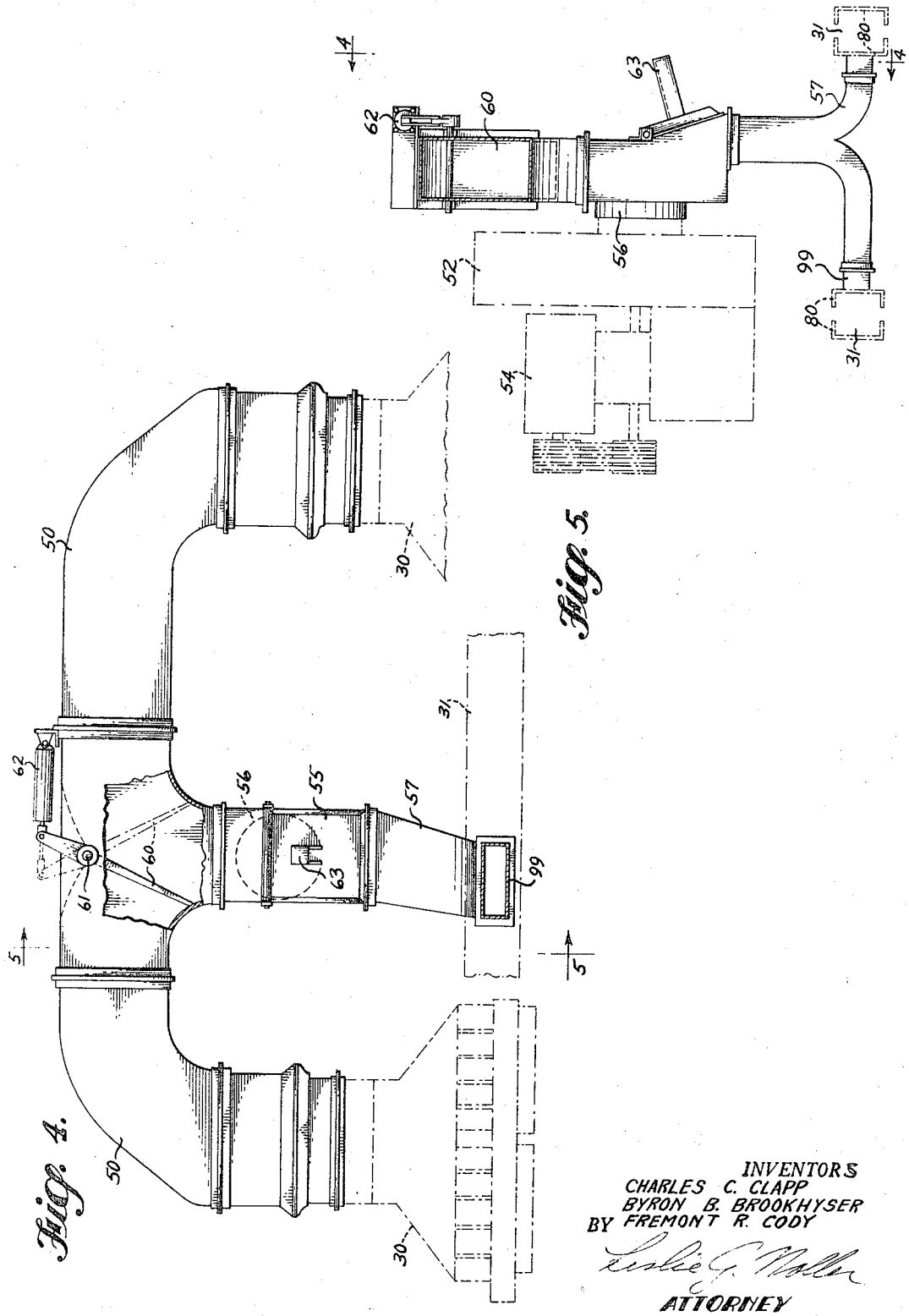

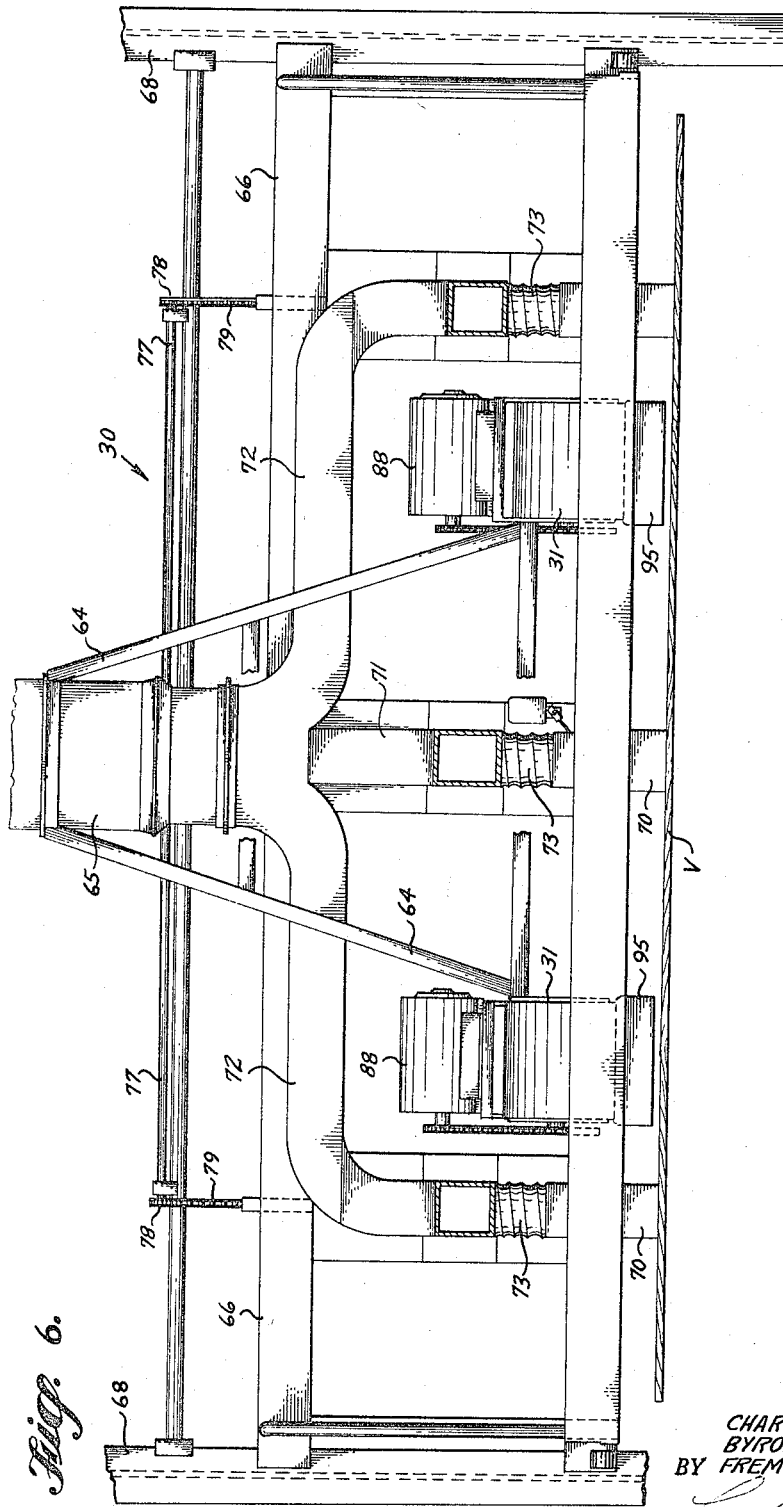

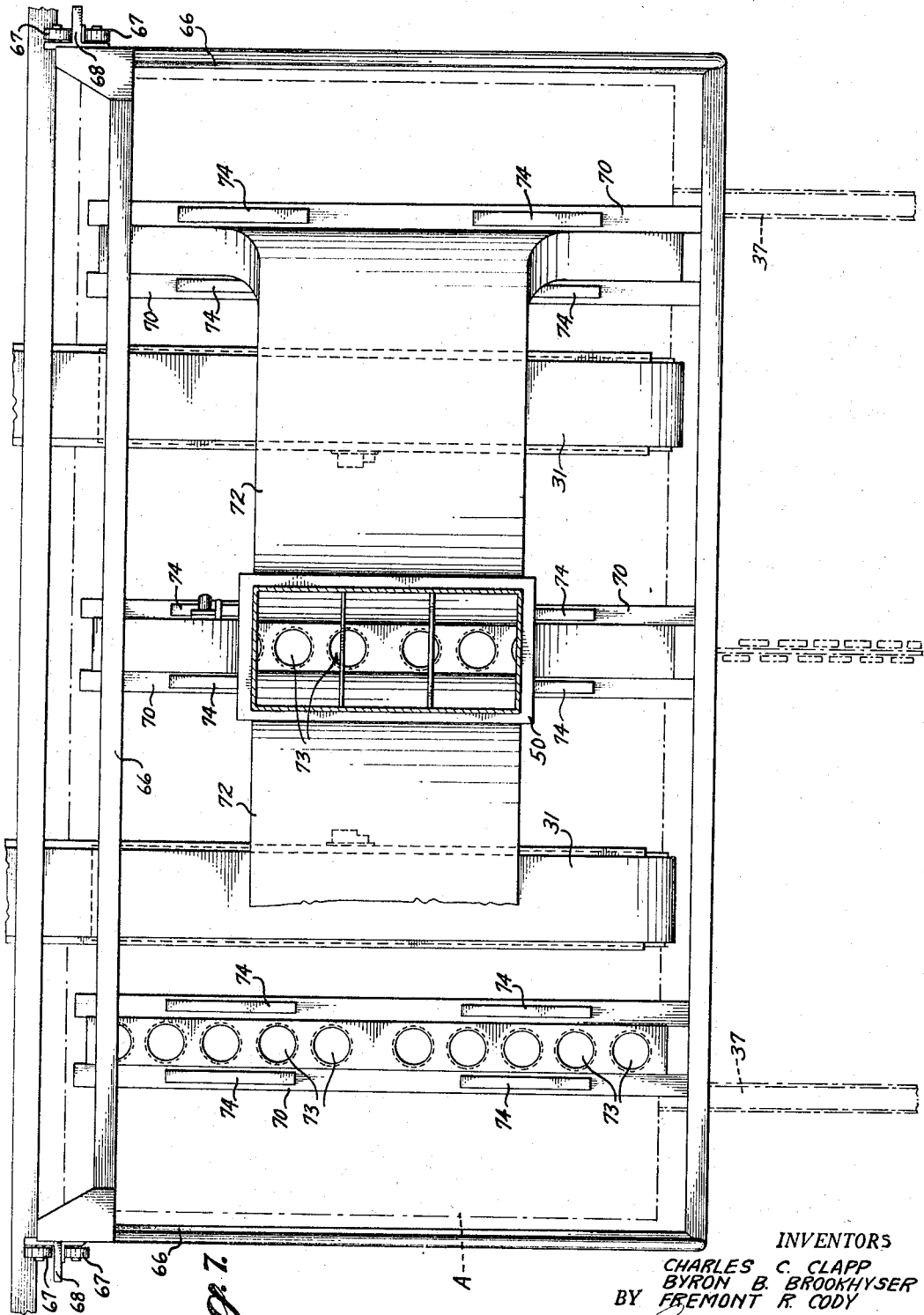

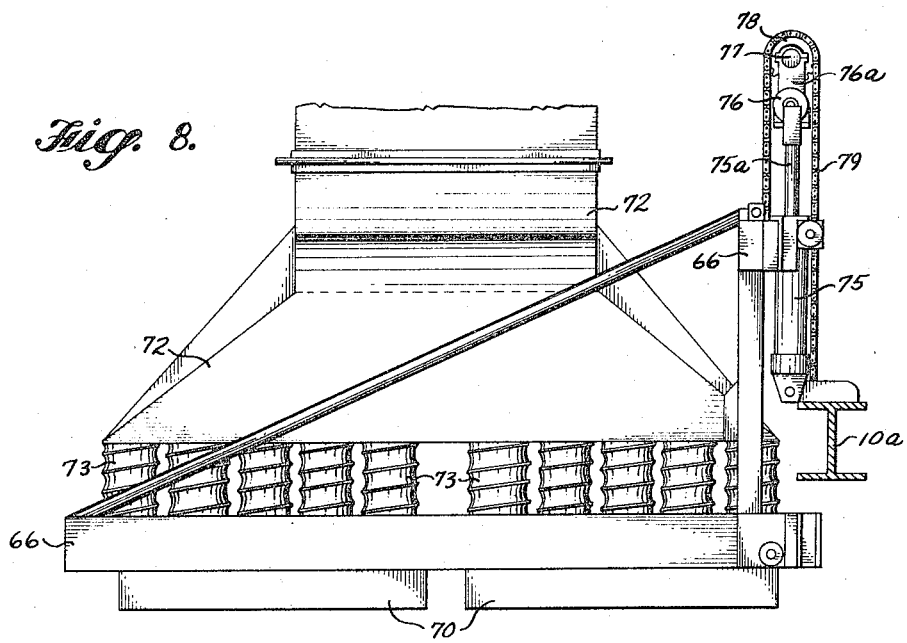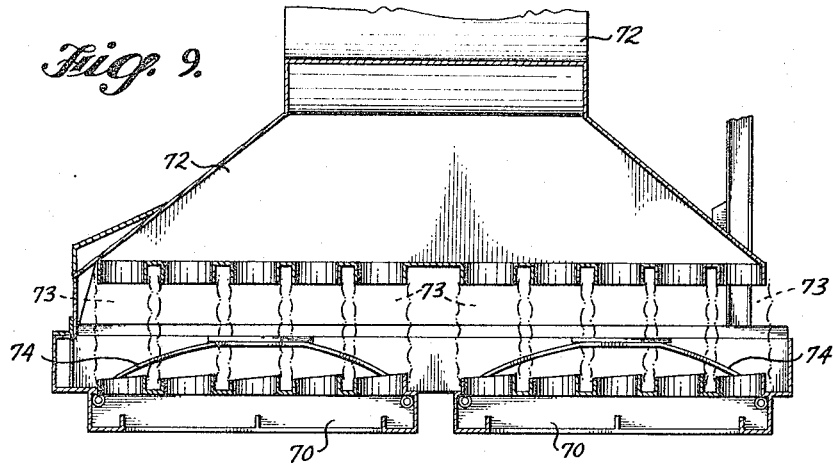

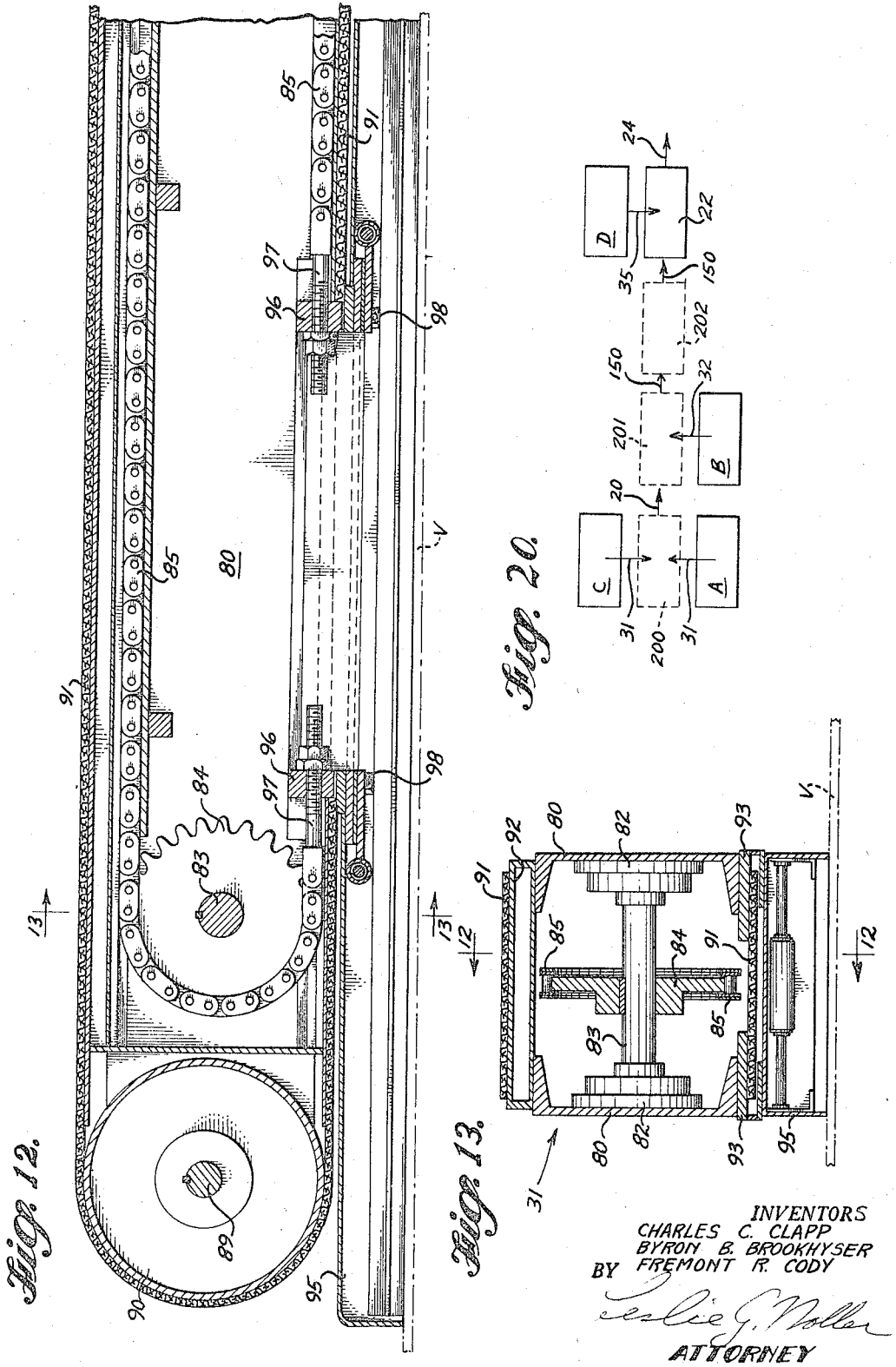

April 4, 1967 C. C. CLAPP ETAL 3,312,327
PLYWOOD LAY-UP MACHINE
Original Filed Sept. 5, 1961 11 Sheets-Sheet 10
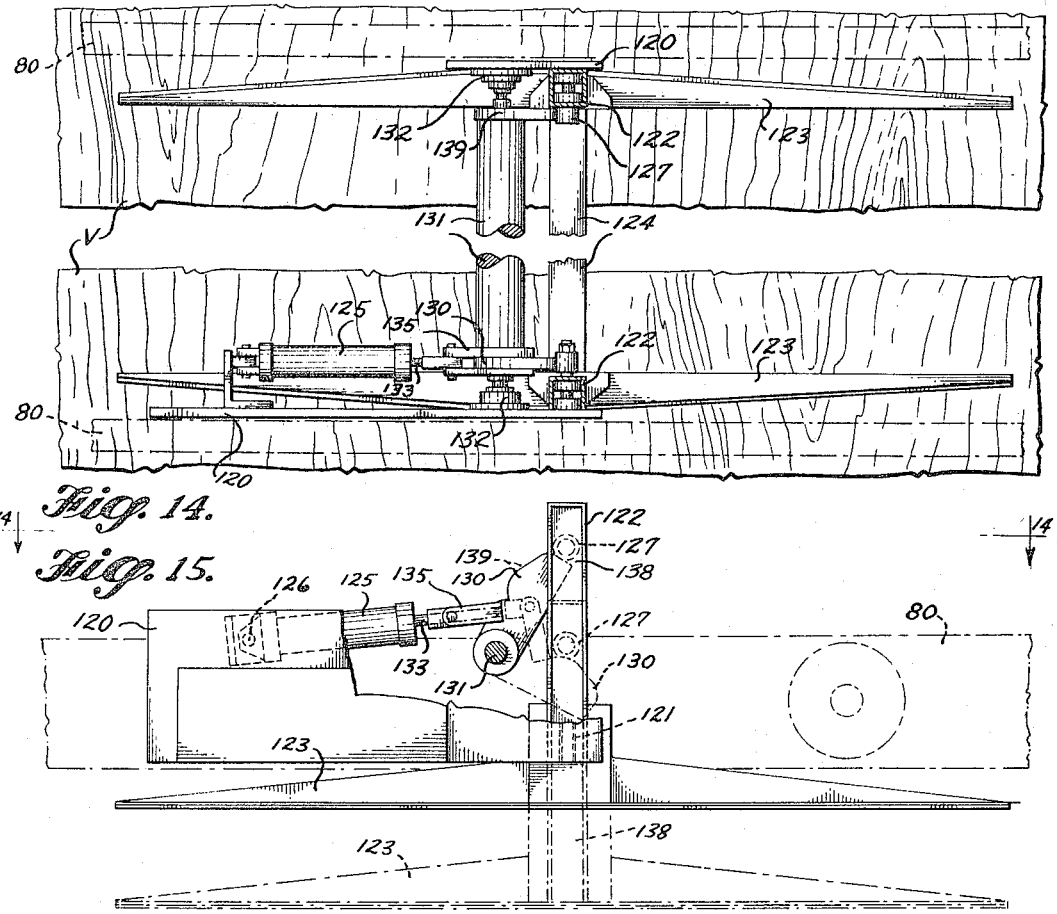
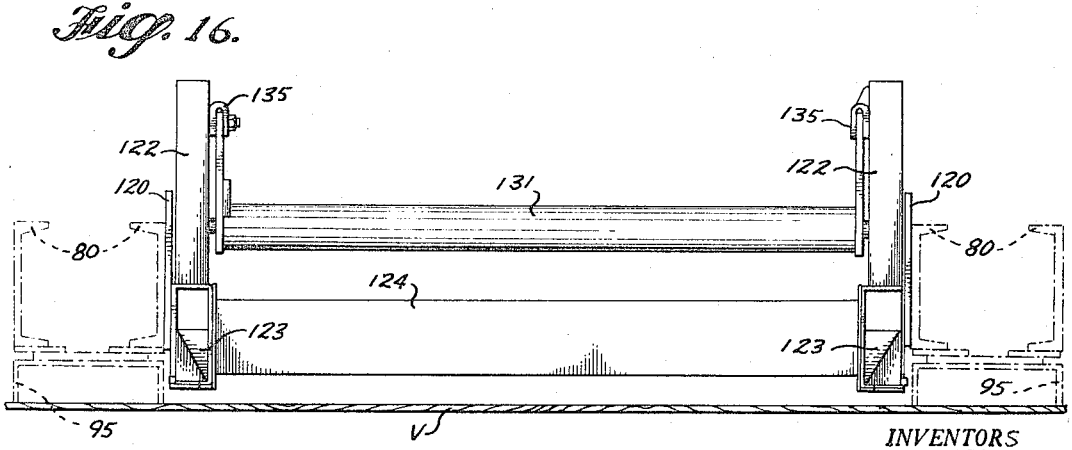
INVENTORS
CHARLES C. CLAPP
BYRON B. BROOKHYSER
BY FREMONT R. CODY
ATTORNEY

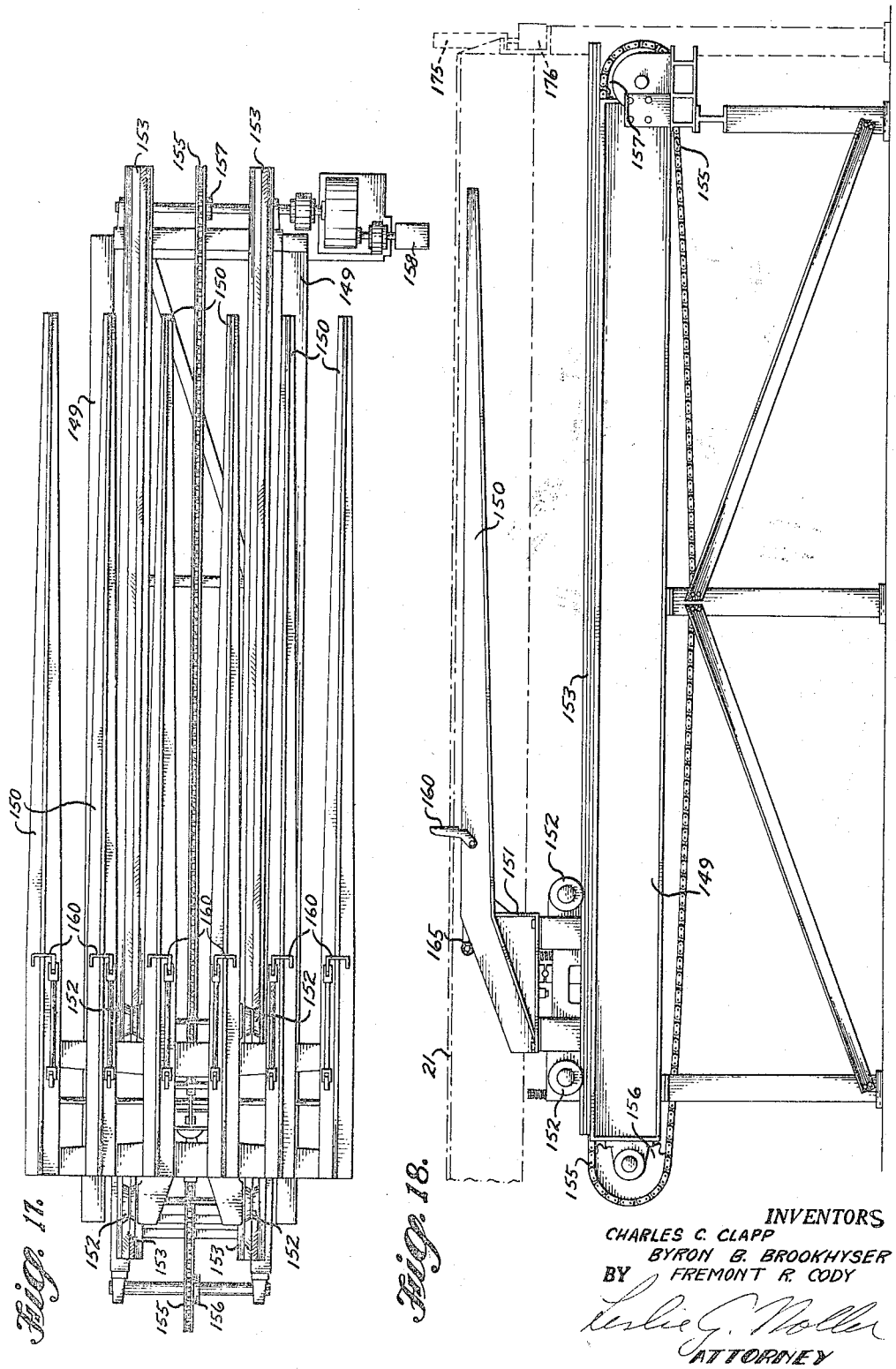

United States Patent Office 3,312,327
Patented Apr. 4, 1967

3,312,327
PLYWOOD LAY-UP MACHINE
Charles C. Clapp, Tacoma, Byron B. Brookhyser, Milton, and Fremont R. Cody, Tacoma, Wash., assignors to Weyerhaeuser Company, Tacoma, Wash., a corporation of Washington
Continuation of application Ser. No. 435,393, Nov. 25, 1964, which is a continuation of application Ser. No. 135,825, Sept. 5, 1961. This application Mar. 25, 1966, Ser. No. 537,538
20 Claims. (Cl. 198—35)

This application is a continuation of Clapp et al. United States application Ser. No. 435,393, filed Nov. 25, 1964, now abandoned, which is a continuation of United States application Ser. No. 135,825, filed Sept. 5, 1961, now abandoned, for a Plywood Lay-Up Machine.

This invention relates to a new and improved machine for the mechanical assembly of wood veneers in the manufacture of plywood.

The construction of plywood must be understood in order to understand the functions of the machine. A panel of commercial plywood is composed of an odd number of sheets of wood veneer which are adhesively united or bonded together in a press. The veneers are assembled in cross-banded relation which means that the grain of the wood does not run in the same direction in any two adjacent sheets. The number of plies may vary— three, five and seven-ply panels being the most common. Certain terminology has been adopted in the trade to identify and distinguish the different sheets.

Regardless of the number of plies, there is always a face sheet and a back sheet, the face sheet being of the best quality although for some purposes the back sheet must also be of high quality. Lower grade material, however, is ordinarily used for the interior plies because of the scarcity of wood veneer of face sheet quality. Because of consideration of grain direction and quality the panels cannot be laid up by taking veneers at random; the veneers must be selected and segregated for the different positions in the panel.

The grain runs lengthwise in the face and back sheets regardless of the number of plies. In a three-ply panel the single intermediate sheet is designated as a core sheet, the primary distinguishing characteristic being the transverse direction of the grain. A five-ply panel includes, additionally, another longitudinally grained sheet designated as a center sheet and another core sheet. The order of the sheets is as follows: face, core, center, core, back; the face, center and back sheets having longitudinal grain and the two core sheets having transverse grain. A seven-ply panel contains a second center sheet and an additional core sheet, the order of sheets then being face, core, center, core, center, core, back. A nine-ply panel is similarly constructed, by the interposition of an additional center and core combination.

It will be observed in each of the above constructions that regardless of the number of plies, each core sheet is always sandwiched between some combination of the face, back and center sheets. As a result of this uniformity of construction it has become the practice to glue coat only the core sheets. The face, back and center sheets are ordinarily assembled without any glue spread, all the glue for the combination being contained on the one or more core sheets which are present. This method of assembly is utilized to advantage in the present machine whereby the different combinations may be assembled with facility, without requiring any change in the basic mode of operation of the machine. By assembling glue spread cores in predetermined order with backs and faces, the machine will produce three-ply combinations. By assembling glue spread cores with faces, backs and centers in different sequences, the machine will produce five, seven or nine-ply combinations all conforming to standard forms of construction.

The general object of the invention is to provide an improved method and apparatus for laying up veneer sheets to assemble plywood panels.

Other objects are to reduce the manual handling and cost of the lay-up operation, to provide a practical and efficient lay-up machine which will operate with a minimum of manual assistance and supervision, to provide a machine in which most of the functions and handling operations are carried out by automatic mechanisms, to provide a machine of the type described which is of relatively simple construction that will be easy to operate, maintain, repair and clean, to provide a machine of the type described which is economical of floor space and provides an efficient work flow pattern, and to provide a machine which is flexible in its operation in regard to products, schedules, press cycles and the like.

The present machine has a linear work flow pattern in combination with a plurality of cross transfer assemblies for bringing the different types of sheets in to the linear work flow from opposite sides thereof at different stations therealong. Vacuum pickup assemblies are arranged to remove sheets from stacks of stock material and make the sheets available one at a time to the transfer assemblies which also employ vacuum holding means for moving the sheets transversely to a central longitudinal conveyor. These mechanisms handle only the dry sheets which do not require a glue spread. A single operator then takes core sheets from a glue spreader and assembles them in the proper order with the dry sheets delivered by the machine. At the operator's station is a control panel to control the operation of the machine functions so that the dry sheets will always be available as he is ready for them. The stacks of stock sheets are arranged for convenient access to receive a load at a time from a fork lift truck or the like so that the whole operation proceeds smoothly and substantially continuously without interruption.

The invention will be better understood and the foregoing and other objects and advantages will become apparent from the following description of a preferred embodiment of the invention illustrated in the accompanying drawings. Various changes may be made, however, in the details of construction and arrangement of parts and certain features may be used without others. All such modifications within the scope of the appended claims are included in the invention.

In the drawings:

FIGURE 1 is a plan view of a machine embodying the principles of the invention;

FIGURE 2 is a side elevation view of the machine;

FIGURE 3 is a perspective view of the frame of the machine;

FIGURE 4 is an elevation view with parts broken away, showing the air duct system for the vacuum pickup and transfer assemblies at the double loading station;

FIGURE 5 is a view taken on the line 5—5 of FIGURE 4;

FIGURE 6 is an enlarged elevation view showing a vacuum pickup assembly and associated cross transfer assemblies;

FIGURE 7 is a top plan view, with parts broken away, of the structure shown in FIGURE 6;

FIGURE 8 is an elevation view of one end of the pickup assembly shown in FIGURES 6 and 7;

FIGURE 9 is a vertical sectional view of a pickup assembly;

FIGURE 10 is a top plan view of one of the cross transfer assemblies;

FIGURE 11 is a side elevation view of the structure shown in FIGURE 10;

FIGURE 12 is an enlarged vertical sectional view of the left end of the transfer assembly shown in FIGURE 11, taken on the line 12—12 of FIGURE 13;

FIGURE 13 is a cross sectional view taken on the line 13—13 of FIGURE 12;

FIGURE 14 is a top plan view of the kicker bar assembly associated with the cross transfer assemblies;

FIGURE 15 is an elevation view of the structure shown in FIGURE 14;

FIGURE 16 is an elevation view taken at right angles to FIGURE 15;

FIGURE 17 is a top plan view of the deliverey fork;

FIGURE 18 is a side elevation view of the structure shown in FIGURE 17;

FIGURE 19 is an enlarged fragmentary sectional view of the fork carriage shown in FIGURE 18; and FIGURE 20 is a diagram of the method of the invention.

General description of the machine

Referring first to FIGURE 3, the frame 10 of the machine comprises a plurality of uprights 11 interconnected by longitudinal beams 12 and cross members, not shown. Extending from the discharge end of the frame are a plurality of horizontal longitudinal beams 13. Also, there is shown a plurality of base supports 14 at two of the stock supply stations on the near side of the machine.

Supported centrally in the frame 10 are a longitudinal flat belt conveyor 20 and, extending as a continuation thereof, a chain belt conveyor 21 which continues out of the elevated portion of frame 10 to the extremity of beams 13, as shown in FIGURE 2. Beyond the end of conveyor 21 is a lay-up table 22 on a lower level equipped with rollers 23 and beyond the end of the lay-up table is a belt conveyor 24 mounted at a still lower level to carry stacks of assembled veneers to the press. Lay-up table 22 is equipped with an automatic indexing lift mechanism 25 which keeps the top of the stack of veneers on this table at a constant height as veneers are added during the lay-up process. This lift mechanism will also index automatically to a height on a level with conveyor 24 for moving the stack off the table onto the conveyor.

As shown in FIGURES 1 and 2, there are two vacuum pickup assemblies 30 overhanging one side of the frame 10 and a single vacuum pickup assembly 30 overhanging the other side of the frame. Associated with these vacuum pickup assemblies are a pair of double loading station cross transfer assemblies 31 and a pair of single loading station cross transfer assemblies 32. Under the pickup assembly 30 associated with the single loading station cross transfer assembly 32 is a loading or stock station B for veneer back sheets. On the same side of the machine under the pickup assembly 30 associated with the double loading station cross conveyor assembly 31 is a stock supply station A for face sheets. Under the pickup assembly 30 associated with the double loading station cross conveyor assembly 31 on the opposite side of the machine is a stock supply station C for center sheets. The core stack D is located just behind the glue spreader 35 at the lay-up table 22 as shown in FIGURE 1. The operator stands at the lay-up table and operates the machine through a convenient control board equipped with push buttons at 36.

Each stock station A, B and C is equipped with a stock replenishing conveyor 37 on the floor. This conveyor in each instance is arranged to receive a stack of veneer from a fork lift truck or the like and deposit the load on an automatic indexing lift platform 38 as shown in FIGURE 2. These three platforms define the stock stations A, B and C and the core stock station D may be similarly equipped. A load 39 of back veneers is shown on the platform 38 in station B. As veneers are removed from the top of the stack, the platform rises automatically to keep the top of the stack at a constant predetermined level so that pickup assembly 30 can pick up the top sheet.

From the foregoing general description it will be understood that veneers are lifted one at a time from the top of the stacks in the three stations A, B and C on opposite sides of the machine by pickup assemblies 30. The cross transfer assemblies 31 and 32 then take the sheets and move them horizontally into positions over the conveyors 20 and 21 which advance with a step by step intermittent movement under the control of the operator at the lay-up table 22. At the proper time and in the proper sequence, the veneers are dropped onto the longitudinal conveyors 20 and 21 or on top of sheets previously deposited on these conveyors, depending upon the requirements of the panel construction in production. After the deposition of each sheet or pair of sheets on lay-up table 22 the operator takes a core sheet from the glue spreader 35 and manually assists it in dropping in proper position on top of the stack then forming on the lay-up table. When a press load has been accumulated on lay-up table 22, the operator levels this table with conveyor belt 24 and transfers the stack to the conveyor belt, clearing the lay-up table for a new stack. This, in brief, is the general mode of operation of the machine.

Detailed description of the machine

In FIGURE 1 there is an overhead transverse air duct 50 leading to the vacuum pickup assemblies 30 at stations A and C and a similar air duct 51 leading to pickup assembly 30 at station B. These ducts connect with suction fans 52 which discharge upwardly at 53 into exhaust stacks, not shown. The fans are driven by motors 54.

The arrangement of duct 50 is shown in greater detail in FIGURES 4 and 5. The duct 50 has a vertical branch 55 fitted with an inlet connection 56 for the fan 52. This suction connection with the fan also draws air from two lower branches 57, 57 connected with the double loading station cross transfer assemblies 31. The duct 51 similarly connects with the two single loading station cross transfer assemblies 32 in FIGURE 1.

The transverse duct 50 is equipped with a damper valve 60 pivotally mounted at 61. A fluid pressure cylinder 62 has a piston connected with the valve to connect either one of the two opposite pickup assemblies 30 with the suction inlet 56. When this valve is in the position shown in solid lines, suction pressure exists in the right pickup assembly 30 in FIGURE 4 while the left pickup assembly 30 is cut off from suction. Under actuation by cylinder 62, the valve 60 moves to the opposite limit position shown in broken lines to establish suction pressure in the left pickup assembly and cut off suction from the right pickup assembly.

The numeral 63 designates, generally, an air valve in duct section 55 just below suction connectinon 56 to shut off suction from transfer assemblies 31. Duct 51 is similarly equipped with a valve 63 but does not have a damper valve 60 since there is only one pickup assembly 30 connected with duct 51. The two valves 63 are actuated to open and closed positions by fluid cylinder and piston units 45 similar to the unit at 62.

As shown in FIGURE 6, the downturned outer end of duct 50 on each side of the machine is supported by a stationary duct support 64 on the stationary frames of the cross transfer assemblies 31. The outer end of duct 51 is similarly supported on transfer assemblies 32. A vertically movable duct section 65 fits telescopically within the lower end of 50 in a sliding joint equipped with a suitable air seal. Each vacuum pickup assembly 30 includes a rectangular frame 66 equipped with rollers 67 for up and down movement on a pair of vertical guides 68 as further shown in FIGURE 7. Slidable duct section 65 connects with a plurality of suction heads 70 all carried by the frame 66 for vertical movement. These suction connections comprise a central branch 71 and two lateral branches 72.

Suction heads 70 are flexibly mounted in the frame 66 to accommodate themselves to the top sheet of the veneer on the stack. A plurality of flexible hoses 73 connect the suction heads 70 with branch ducts 71 and 72. The suction heads have narrow open slots on their lower sides to form vacuum cups for picking up the veneer. Leaf springs 74 resiliently urge the slotted heads downwardly to lower limit positions as shown in FIGURE 9.

Each pickup assembly 30 is raised and lowered by a vertical fluid cylinder 75 having a piston rod 75a connected with horizontal elevator beam 76 as shown in FIGURE 8. Elevator beam 76 slides up and down on the vertical guides 68 in FIGURES 6 and 7 as shown further in FIGURE 2. Brackets 76a have bearings supporting a shaft 77 with a pair of sprocket wheels 78 on the elevator beam. Chains 79 on these sprocket wheels are each anchored at one end to a stationary beam 10a in the frame of the machine and attached at the other end to the pickup assembly frame 66. When the piston rod raises beam 76 the chains raise the frame 66 twice as far. The cylinder and piston unit is located at the midlength of beam 76 and the sprocket wheels and chains are located on opposite sides of the cylinder to hold beam 76 and frame 66 level, the sprocket wheels being keyed to shaft 77.

FIGURES 10–13 illustrate the details of construction of one of the double loading station cross transfer assemblies 31. The various parts of these assemblies are mounted on and supported by a pair of channel beams 80 as best shown in FIGURE 13. These beams are supported from the logitudinal frame members 12 of the machine by brackets 81 as shown in FIGURE 11. Near their ends the channels 80 have bearings 82 for the shafts 83 of sprocket wheels 84. A chain 85 is trained around the sprocket wheels and also around a driving sprocket, not shown, on the shaft 86 in FIGURE 11. Shaft 86 is driven by a sprocket wheel 87 from an electric motor 88.

The ends of channel beams 80 have similar bearings for shafts 89 carrying pulleys 90. A flat belt 91 is trained around the pulleys 90. The upper reach of the belt rides on a slide plate 92 whereby the gap between the flanges of channels 80 is closed on the upper side of these beams. On the lower side of the beams the belt can slide against a pair of slide plates 93 which are spaced apart to provide open slot 94 therebetween.

An elongated rectangular suction head 95 has a projecting neck portion 96 which travels in the slot 94. Neck portion 96 comprises an open center rectangular frame, the ends of which are connected with bolts 97 in the ends of chain 85. This neck portion 96 is also connected with the belt 91 by means of screws or bolts 98. The belt has a rectangular opening in register with the opening in neck portion 96 whereby suction pressure in the space between channels 80 is communicated to suction head 95 while the belt 91 seals the remainder of slot 94.

It was previously explained in connection with FIGURES 4 and 5 that branch air ducts 57 were connected with the cross transfer assemblies 31. The cross transfer assemblies are represented in FIGURE 5 by the channels 80. A duct connection 99 in one of thes channels connects the assembly with air duct 57. Thus, the space between channels 80 in FIGURE 13 comprises an air duct or suction chamber which is closed at its ends and on all sides except for the opening through neck portion 96 of suction head 95. The suction head is open on its lower side to function as a vacuum cup.

The suction heads 95 are slightly below the level of suction heads 70 in raised position and are adapted to receive a sheet of veneer V from one of the vacuum pickup assemblies 30 and carry the veneer to a central position over the conveyor belts 20 in FIGURE 2. As suction heads 70 rise in FIGURE 6 above suction heads 95, the veneer is transferred to the latter and released from the former. The suction heads 95 on the two cross transfer assemblies 31 at the double loading station are movable from one end to the other of these assemblies by chains 85 and motor 88 to receive veneers from the stock station A and C on opposite sides of the machine and drop these veneers on the belts 20.

The single loading station cross transfer assemblies 32 are similarly constructed and arranged except that they project from only one side of the machine to receive veneers from the single stock station B.

FIGURES 14 to 16 illustrate a kick bar device for guiding the veneers from the cross transfer suction heads 95 to the conveyor. This mechanism is mounted by means of plates 120 secured to vertical faces of the channel members 80 in the cross transfer assemblies 31 at the double loading station and, also, the cross transfer assemblies 32 at the single loading station. Each plate 120 is equipped with a vertical guide 121 directly over the center line of conveyors 20 and 21 in FIGURE 2. Slidably mounted to each guide 121 is a vertical member 122 and connected to the lower end of each of these vertical members is a horizontal kick bar 123 adjacent to and parallel with the channel members 80. The two vertical members and kick bars are interconnected by a horizontal spreader 124 for movement in unison.

The kick bars are raised by means of a fluid pressure cylinder 125 pivotally mounted at 126 on one of the plates 120. The upper end of each vertical member 122 is equipped with a roller 127. These rollers are engageable with lift levers 130 fixedly connected with the opposite end portions of a shaft 131. Shaft 131 is journaled for rotation in bearings 132 on the plates 120. The outer end of piston rod 133 is pivotally connected at 134 between a pair of clevis arms 135 fixedly attached on opposite sides of one of the lift levers 130. The two lift levers 130 are rigidly interconnected through shaft 131 so that actuation of one of these levers moves the other to the same extent.

The kick bars are normally held in raised position as shown in full lines in FIGURE 15. In this position the weight of the kick bars is sustained by rollers 127 which bears against end surfaces 138 on the two lift levers 130. In this position of the kick bars they are spaced slightly above a sheet of veneer V supported therebeneath by the suction heads 95 as shown in FIGURE 16.

When piston rod 133 is extended by the actuation of cylinder 125, lift levers 130 rotate rapidly approximately 90° clockwise to the broken line position in FIGURE 15. This permits the kick bars to drop by gravity to their lower position shown in broken lines in FIGURE 15. In dropping to their lower position the kick bars have about one-half inch of free fall before striking the veneer sheet, as shown in FIGURE 16. Meantime the fan damper is being moved to release suction on transfer heads, and shortly after kick bar has contacted the sheet, it is forced to the conveyor by gravity forces on sheet and kick bar. The air resistance on the sheet retards same so that sufficient friction contact is maintained between sheet and kick bar to assure vertical placement of sheet.

In the lower position of the kick bars, the rollers 127 rest on the sloping cam surfaces 139 of lift levers 130. The kick bars are raised by retracting piston rod 133 into cylinder 125 causing lift levers 130 to rotate back counterclockwise to the full line position in FIGURE 15. This cams the rollers 127 and kick bars upward, the piston rods reaching their inward limit of movement with the rollers bearing against the outer end surfaces 138 of the lift levers.

FIGURES 17 to 19 illustrate the lay-up feeder delivery fork assembly 150. This assembly comprises a plurality of cantilever arms fixedly mounted at their trailing ends on a carriage 151 having wheels 152 running on track rails 153 on a pair of beams 149. The carriage is also equipped with hold-down wheels 154 which roll on the undersides of the top flanges of the beams.

Carriage 151 is connected to a chain 155 trained around sprocket wheels 156 and 157 at the ends of the beams 149. Sprocket wheel 157 is driven by a hydraulic motor 158 to reciprocate the carriage on the beams as shown in FIGURE 18. The top edges of the fork arms provide a horizontal supporting surface slightly below the top surface of conveyor chains 21 in FIGURE 2. When the fork arms are retracted to the left as shown in FIGURE 18, they are disposed between the conveyor chains 21 but when they are advanced to the right, they extend beyond the end of the conveyor chains and overhang the lay-up table 22 in FIGURE 2.

Lugs 160 are arranged to transfer the veneer from conveyor chains 21 to the fork assembly just described. Referring now to FIGURE 19, each lug 160 is pivotally mounted at 161 on one of the arms 150. The lug has a bell crank lower end pivotally connected at 162 with one end of a horizontal link 163. The other end of link 163 is pivotally connected at 164 with one arm of a bell crank 165. The other arm of bell crank 165 is pivotally connected at 166 with the upper end of a vertical link 167. The lower end of each vertical link 167 is pivotally connected at 168 with an arm 169 on a shaft 170. Shaft 170 and its arms 169 are rotatable by an actuating arm 171 connected with the piston rod 172 in a cylinder 173.

When piston rod 172 is extended from cylinder 173 as shown in full lines in FIGURE 19, the lugs 160 stand upright and project about the conveyor chains 21, so that when the fork assembly moves to the right in FIGURE 18, a sheet of veneer on conveyor chains 21 will be moved off the end of the conveyor and supported on the fork arms over the lay-up table 22 in FIGURE 2. Then, when the fork assembly is retracted back between the conveyor chains 21, it is necessary to retract the lugs 160 so that the conveyor may move another sheet of veneer over the fork arms. When the piston rod 172 is retracted into cylinder 173, the lugs 160 are rotated 90° counterclockwise to the broken line position in FIGURE 19 so that they will not interfere with the movement of veneer on conveyor chains 21.

As just explained, the carriage 151 moves to the right end of beams 149 in FIGURE 18 to carry a veneer sheet out over lay-up table 22. After such excursion the carriage immediately reverses, causing the sheet to be stripped from the fork by a bumper block 175. In reverse movement the fork arms slide rapidly from under the sheet, allowing the sheet to drop on top of other veneers on the lay-up table. Bumper block 175 is mounted on a piston rod in a vertical fluid cylinder 176. The bumper block is raised to stripping position before the fork is retracted and then lowered to clear the veneer before the next feed movement of the fork.

*Operation*

The method of assembling veneers is illustrated diagrammatically in FIGURE 20. The stacks of face, back, center and core veneers are illustrated at A, B, C and D, respectively. The stacks of face and center sheets A and C are located on opposite sides of a double loading station 200 and the back sheets B are positioned on one side of a single loading station 201. Cores D are opposite lay-up table 22. Between station 201 and the lay-up table is a holding station 202. The cross transfer assemblies 31 and 32 are represented by arrows as are also conveyors 20, 21 and 24 and delivery fork 150.

After a face or center has been dropped in station 200, the next movement of conveyor 20 carries it to station 201. The sheet then stops in station 201 and in certain cycles for certain forms of panel construction a back sheet B is placed on top of it. At the same time another face or core is dropped in station 200. In the next movement of the conveyors 20 and 21 all the sheets on the conveyors advance one station, bringing the sheet or sheets from station 201 to rest at holding station 202. The delivery fork 150 also rests at this station and, when the conveyors begin another increment of movement, the fork 150 moves ahead faster than the conveyor 21 carrying the sheet or sheets from station 202 to the lay-up table 22. While fork 150 is delivering its load as described, the conveyors are advancing all the sheets thereon one station, carrying another sheets or sheets to the holding station 202.

After each station to station movement the conveyors 20 and 21 stop while the operator takes a core sheet D from the glue spreader and lays it on top of the sheet or pair of sheets last received from the delivery fork. When the operator is ready for another sheet or sheets from the delivery fork, he merely restarts the conveyors and delivery fork to repeat the cycle. When the final sheet of face veneer which will complete a press load has been deposited at loading station 200, an automatic counter turns on a signal light 180 in FIGURE 2 and halts further deposit of sheets at loading station 200 and 201, thus a press load is completed with an individual top sheet. By operating kick switch KS at least once more and then resetting the counter by depressing a so labeled button on panel 36, sheets will again be deposited on the conveyor with the first sheet for the next press load being an individual back sheet.

Pickup assemblies 30 and cross transfer assemblies 31 and 32 operate in automatic cycles of their own to pick up the sheets A, B and C and drop them on the conveyors 20 and 21 at the proper times in accordance with the type of plywood construction in production whereby these sheets are always available for the operator in proper sequence when he is ready for them. For example, in making a three-ply construction there are no center sheets and the cross transfer assemblies 31 then supply only face sheets A to the double loading station 200. After each movement of the conveyors the cross transfer assemblies 31 deposit a face sheet A outside face up in station 200 and simultaneously, the cross transfer assemblies 32 drop a back sheet B outside face down on top of a face sheet in station 201.

With each movement of delivery fork 150 the operator receives the two sheets, the bottom one being a face sheet outside face up and the top one being a back sheet outside face down. This combination completes one panel and starts another. On top of the back sheet he manually places a glue spread core sheet D and then starts another machine cycle to deliver another pair comprising face and back sheets. Thus, in making a three-ply construction, consecutive machine cycles are all identical.

More operations are involved in making a five-ply construction and consecutive machine cycles are not identical. In this case a back is dropped on top of each face as before but backs are not dropped on top of the centers. Assume that a face has been dropped in station 200. When the conveyors have moved forward, a back is dropped on top of this face in station 201 and a center is then dropped in station 200. After the next movement of the conveyors the face and back pair waits for the operator in station 202, and cross transfer assemblies 32 remain inactive so that a back will not be dropped on top of the center now in station 201. Cross transfer assemblies 31 drop another face at station 200. Thus, the operator receives on lay-up table 22 alternately a face and back combination and a center by itself. By laying a glue spread core sheet on each combination and single sheet, five ply constructions are assembled consisting of back, core, center, core and face. There is no possibility of inadvertently placing a glue-spread core sheet between a face sheet of one panel and a back sheet of the next panel because these two sheets are always delivered together. The panels are built up on the lay-up table on top of another until signal light 180 indicates a full press load.

The machine has a control system with push button switches, limit switches, relays and solenoid valves for initiating all the various operations in proper sequence to produce the various forms of construction such as three-ply panels, five-ply panels, etc., and further includes selector circuits to change the sequence of certain operations or omit or add certain operations according to the type of panel construction desired. By merely pushing a selector push button switch the machine changes its program of operations automatically to a new program. There is no delay for making any other adjustments to effect the change-over.

Assume, for example, that a five-ply construction is in production and that the operator is about to complete the lay-up of one panel and start the next. He has just placed a glue-spread core sheet D on top of a center sheet on lay-up table 22. There is waiting at holding station 202 a back sheet B outside face down on top of a face sheet A outside face up. In station 201 there is a center sheet by itself. Cross transfer assemblies 32 hold a back sheet in readiness over this station but do not drop it. In station 200 a face sheet has been dropped by cross transfer assemblies 31 and the cross transfer assemblies now hold a center sheet in readiness. All three pickup assemblies 30 rest in their lower positions on top of the stacks A, B and C in readiness to pick up the top sheets. Suction fans 52 are operating and the rest of the machine is at rest.

The operator then starts the next cycle of operation by kicking kick switch KS at the lay-up table 22, this switch being indicated by its kick plate in FIGURE 3. This starts conveyors 20 and 21 and the motor 158 which drives the carriage for delivery fork 150 and raises lugs 160. Fork 150 advances rapidly carrying the face and back sheets from holding station 202 to the lay-up table. Upon reaching delivery position the fork carriage actuates limit switch LS-1 in FIGURE 3, stopping and reversing carriage motor 158, actuating lug cylinder 173 to retract fork lugs 160 and actuating bumper cylinder 176 to raise bumper 175. As the fork reverses, the pair of sheets is stripped from the fork by bumper 175 allowing the sheets to drop on the lay-up table while the fork returns to station 202 passing under the center sheet which is just arriving from station 201. The operator then takes another core sheet D from the glue spreader and lays it on top of the back and face sheet combination which has just been deposited on the lay-up table. While he is doing this the machine is busy with various automatic operations in preparation for the next cycle.

In its return movement the fork carriage actuates limit switch LS-2, stopping carriage motor 158 and retracting bumper 175.

The advancement of the conveyors 20 and 21, FIGURE 2, is measured by a revolution counter 1001, FIGURE 2, which, after sufficient travel to insure that sheet 201 has moved past LS-4, actuates an electrical relay that causes said conveyors to stop when the leading edge of sheet from 200 deflects upstanding actuating finger on LS-4, thus insuring proper position of the face sheet before the back sheet is placed onto it. This conveyor travel has moved the face sheet in station 200 to station 201 and the center sheet from station 201 to station 202. The kick bars drop a back sheet B on the face sheet A in station 201 and drop a center sheet C on the conveyor in station 200. A time delay relay raises the kick bars a few seconds later and energizes the motors 88 of both cross transfer assemblies 31 and 32 to move out for another sheet.

This time the cross transfer assembly 31 moves its suction heads 95 towards stack A to receive a face sheet instead of a center sheet. The outward movement of the cross transfer assemblies actuates switches LS-19 and LS-29 to raise the two next active pickup assemblies 30, one lifting a sheet B and the other lifting a sheet A. The cross transfer suction heads 95 arrive in position to receive these sheets and actuate limit switches LS-11, 12, 21 and 22 to stop the motors 88. As pickup assemblies 30 continue to rise, limit switches such as LS-24 open fan valves 63 to re-establish suction in the suction heads 95 and the sheets are transferred to these suction heads from the suction heads 70.

Upon reaching their upper positions the vacuum lift assemblies 30 actuate limit switches such as LS-25 which reverse the motors 88 to move cross transfer suction heads 95 with the new sheets of veneer into the machine. When the veneer sheets have cleared pickup assemblies 30, the cross transfer assemblies actuate switches such as LS-20 and LS-30 which lower pickup assemblies 30 to rest positions on their respective stacks of veneers. The inward movement of the cross transfer assemblies 31 and 32 is arrested by limit switches such as LS-17 which have depending fingers engaged by the leading edge of the veneer. The switch-actuating fingers are adjusted to locate the sheets directly over the conveyors 20 and 21. These switches are electrically interlocked with the sheet-dropping circuits so that the sheets cannot be dropped prematurely before they have reached center position over the conveyors. The machine now comes to rest until the operator again calls for more sheets by actuating the kick switch KS. Fans 52, of course, remain in operation since the suction heads 95 are holding sheets of veneer.

When the operator again actuates kick switch KS, the conveyors 20 and 21 will be started as before and the fork 150 will then deliver a center sheet C to the lay-up table. It will be observed that in making five-ply panels, the cross transfer assemblies 31 move alternately to opposite sides of the machine to obtain face and center sheets from the stacks A and C. Switches such as LS-24 are actuated by the vacuum pickup assemblies 30 in their downward movements to control fan valve 60 so that suction will be directed to the active one of the two pickup assemblies 30 at the double loading station. It will also be observed that the kick bars 123 on cross transfer assemblies 32 operate only after alternate movements of the conveyors so that back sheets will be dropped on face sheets but not on center sheets. These variations in successive cycles are accomplished by interlocking the cross transfer direction control circuit and kick bar circuit with a counter circuit which counts the conveyor movements.

The program of operations is different again in making seven-ply panels having two center sheets or nine-ply panels having three center sheets and it will be appreciated by persons skilled in the art that the control system may not only be wired to produce any desired sequence or program of operations but, further, that switching arrangements may be provided whereby functional circuit components may be rendered effective or ineffective by merely operating a selector switch button to actuate relays, making effective the proper circuits for any one of a plurality of different operational programs for making the different types of panels. It is not deemed necessary to an understanding of the invention to illustrate the various program wiring diagrams.

FIGURE 3 includes typical limit switches for the functions described but does not include all the switches involved where the showing would be merely repetitive in a different section of the machine. Also, some of the limit switches illustrated in FIGURE 3 control functions of the machine which are necessary for full automatic operation but more or less incidental to the principal functions described above. For example, switches such as LS-23 actuated by the vacuum pickup assemblies 30 are associated with the leveling mechanisms for the stack platforms 38. Switches such as LS-41, 43 and 44 indicate a new load in place and control the replenishing conveyor 37. Switch LS-45 is in an indicator circuit to show when the elevator platform has become empty. Switch LS-42 stops the down movement of the elevator platform. In FIGURE 2 the numeral 181 designates relay and solenoid valve panels for the electrical and fluid pressure systems.

The operation of delivery fork 150 keeps the trailing edge of the stack square and true on the lay-up table which is of advantage in feeding the press. The fast movements of this mechanism give the operator time to lay the core sheets true so that rejects are not caused by the operator. The manipulations required of the operator are relatively few and simple, enabling him to keep up with the machine at a high rate of production without requiring the machine to handle any glue-spread sheets.

Having now described our invention and in what manner the same may be used, what we claim as new and desire to protect by Letters Patent is:

1. A plywood lay-up machine comprising:
    a conveyor,
    a supply station for veneer sheets alongside said conveyor,
    means for moving said conveyor by said supply station,
    means for picking up a sheet from said station, comprising gripping means engageable with the top surface of a sheet at said station including a suction head, and means for removing said gripping means between said station and a position above said station; and said means for receiving said sheet and transferring said sheet comprises similar gripping means including another suction head, and means for moving said latter gripping means between the path of said pick-up gripping means and a position over said conveyor, said receiving and transfer means further comprises an elongated suction box; said means for moving said suction head comprises an endless traveling belt trained around said suction box, and means for moving said belt; and said suction head is on said belt in communication with said suction box,
    means for receiving said sheet from said pick-up means and transferring said sheet to a position over said conveyor, and
    means for removing said sheet from said latter means over said conveyor.

2. The plywood lay-up machine of claim 1 in which there are a plurality of veneer supply stations; and there are at each station:
    said means for picking up a sheet from said station,
    said means for receiving said sheet from said pick-up means and transferring said sheet to a position over said conveyor, and
    said means for removing said sheet from said transfer means over said conveyor; and
    means for actuating said removing means whereby a sheet from a station will be placed on a sheet from a previous station.

3. The plywood lay-up machine of claim 2 in which said means for picking up a sheet comprises:
    gripping means engageable with the top surface of a sheet at said station, and
    means for moving said gripping means between said station and a position above said station; and
    said means for receiving said sheet and transferring said sheet comprises
    similar gripping means, and
    means for moving said latter gripping means between the path of said pick-up gripping means and a position over said conveyor.

4. The plywood lay-up machine of claim 3 in which each of said gripping means comprises a suction head.

5. The plywood lay-up machine of claim 4 in which said receiving and transfer means further comprises:
    an elongated suction box;
    said means for moving said suction head comprises
    an endless traveling belt trained around said suction box, and
    means for moving said belt; and
    said suction head is on said belt in communication with said suction box, 6. A plywood lay-up machine comprising:
    a conveyor,
    a supply station for veneer sheets alongside said conveyor,
    means for picing up a sheet from said station,
    means for receiving said sheet from said pick-up means and transferring said sheet to a position over said conveyor, and
    means for removing said sheet from said latter means and guiding means fractionally engagable with the top surface said sheet as said sheet is moved toward said conveyor.

7. The plywood lay-up machine of claim 6 in which said means for picking up said sheet comprises:
    gripping means engageable with the top surface of a sheet at said station, and
    means for moving said gripping means between said station and a position above said station; and
    said means for receiving said sheet and transferring said sheet comprises
    similar gripping means, and
    means for moving said latter gripping means between the path of said pick-up gripping means and a position over said conveyor.

8. The plywood lay-up machine of claim 7 in which each of said gripping means comprises a suction head.

9. The plywood lay-up machine of claim 8 in which said receiving and transfer means further comprises:
    an elongated suction box;
    said means for moving said suction head comprises
    an endless traveling belt trained around said suction box, and
    means for moving said belt; and
    said suction head is on said belt in communication with said suction box.

10. The plywood lay-up machine of claim 9 in which said means for removing said sheet and guiding said sheet comprises kick bars.

11. The plywood lay-up machine of claim 6 in which there are a plurality of veneer supply stations; and there are at each station
    said means for picking up a sheet from said station,
    said means for receiving said sheet from said pick-up means and transferring said sheet to a position over said conveyor, and
    said means for removing said sheet from said transfer means and guiding said sheet toward said conveyor; and
    means for actuating said means for removing said sheet and guiding said sheet whereby a sheet from a station will be placed on a sheet from a previous station.

12. The plywood lay-up machine of claim 11 in which said means for picking up said sheet comprises:
    gripping means engageable with the top surface of a sheet at said station, and
    means for moving said gripping means between said station and a position above said station; and
    said means for receiving said sheet and transferring said sheet comprises:
    similar gripping means, and
    means for moving said transfer assembly gripping means between the path of said pick-up gripping means and a position over said conveyor.

13. The plywood lay-up machine of claim 12 in which each of said gripping means comprises a suction head.

14. The plywood lay-up machine of claim 13 in which said receiving and transfer means further comprises:
    an elongated suction box;
    said means for moving said suction head comprises:
        an endless traveling belt trained around said suction box, and
        means for moving said belt; and
        said suction head is on said belt in communication with said suction box.

15. The plywood lay-up machine of claim 14 in which said means for removing said sheet and guiding said sheet comprises kick bars.

16. A plywood lay-up machine comprising:
    a conveyor;

a supply station for veneer sheets alongside said conveyor;

means for moving said conveyor by said supply station;

a pick-up assembly comprising:
  a suction head, and
  means for moving said suction head between said station and a position above said station; and a transfer assembly comprising:
  a suction head, and
    means for moving said latter suction head between the path of said pick-up assembly suction head and a position over said conveyor, said transfer assembly further comprises an elongated suction box; said means for moving said suction head comprises an endless traveling belt trained around said suction box, and means for moving said belt; and said suction head is on said belt in communication with said suction box.

17. The plywood lay-up machine of claim 16 in which said transfer assembly further comprises:
an elongated suction box;
said means for moving said suction head comprises:
  an endless traveling belt trained around said suction box, and
  means for moving said belt; and
said suction head is on said belt in communication with said suction box.

18. A transfer assembly comprising:
a pair of laterally spaced parallel beams,
means closing the space between the top edges of said beams,
belt pulleys between the ends of said beams,
an endless belt trained around said pulleys and the top and bottom edges of said beams enclosing the slot between the bottom edges of said beams,
said belt having an opening in register with said slot,
an open bottom suction head on said belt in communication with said belt opening, and
a suction connection through one of said beams communicating with the interior space between said beams,
sprocket wheels between said beams, and an endless chain on said sprocket wheels connected with said belt through said slot for driving said belt, 19. A transfer assembly for a plywood lay-up machine comprising:
an elongated horizontal suction box having a longitudinal bottom slot,
an endless flat belt trained around the ends of said box and having an opening arranged to travel in communication with said slot,
a suction head on said belt in communication with said belt opening, and
a kick bar unit arranged to remove an object from said suction head and means frictionally engageable with the upper surface of said object to guide said object from said suction head during movement of said object from said suction head.

20. A plywood lay-up machine comprising:
a conveyor having spaced parallel belts,
means for feeding sheets to said belts,
means for feeding sheets on top of certain ones of said first sheets,
a reciprocating carriage having a delivery fork with arms between said belts and below the supporting surface thereof, said arms being movable beyond the ends of said belts to transfer sheets on said belts to said arms,
retractable upstanding dogs on the trailing ends of said arms engageable with sheets on said belts, and
a retractable bumper at the end of said belts for stripping sheets from said arms when said carriage reverses.

References Cited by the Examiner
UNITED STATES PATENTS

| | | | |
|---|---|---|---|
| 1,736,340 | 11/1929 | Cross et al. | 271—28 |
| 2,397,720 | 4/1946 | Beane | 214—6 |
| 2,479,060 | 8/1949 | Davidson | 270—58 |
| 2,626,038 | 1/1953 | Smith | 198—35 |
| 2,704,593 | 3/1955 | Galloway | 198—35 |
| 2,960,242 | 11/1960 | Herr | 214—6 |
| 3,066,812 | 12/1962 | Stadelman | 214—1 X |

MARVIN A. CHAMPION, *Primary Examiner.*